R. TALLON.
HOLDBACK.
APPLICATION FILED SEPT. 26, 1919.
1,342,724.
Patented June 8, 1920.
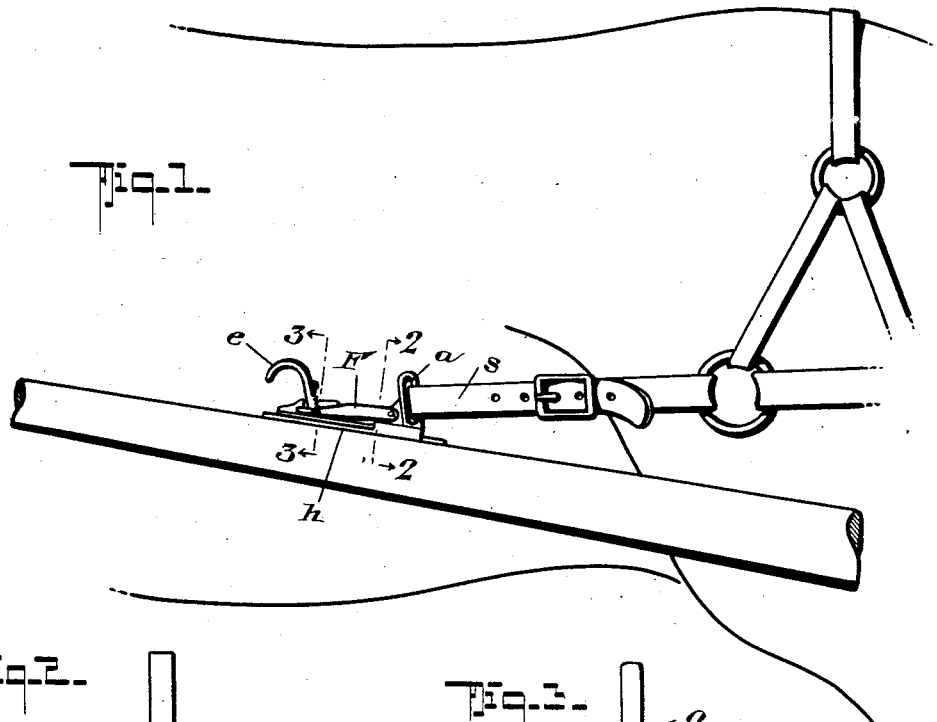
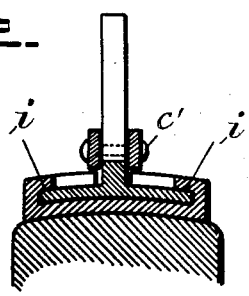
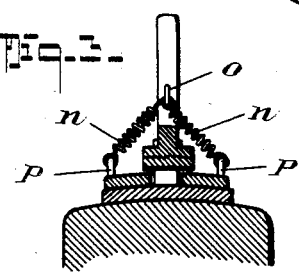
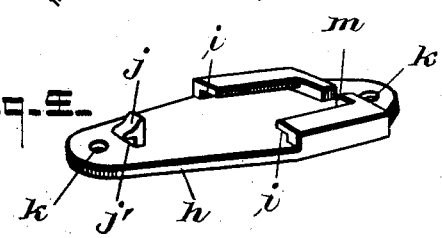
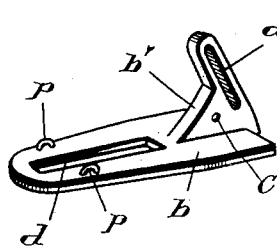
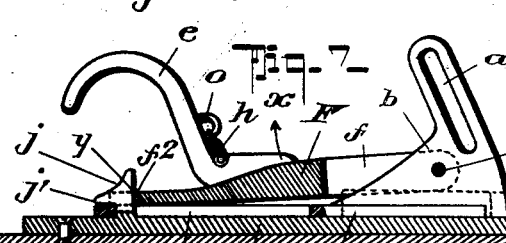
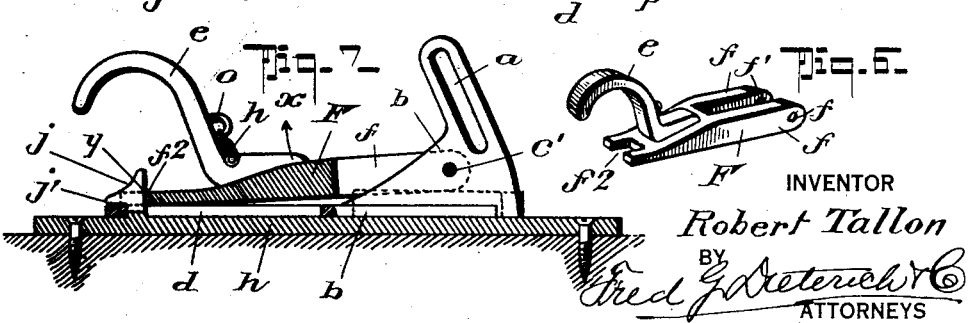
INVENTOR
Robert Tallon
BY
Fred G. Dieterich & Co.
ATTORNEYS

UNITED STATES PATENT OFFICE.

ROBERT TALLON, OF APULIA, NEW YORK.

HOLDBACK.

1,342,724.  Specification of Letters Patent.  Patented June 8, 1920.

Application filed September 26, 1919. Serial No. 326,442.

*To all whom it may concern:*

Be it known that I, ROBERT TALLON, a citizen of the United States, residing at Apulia, in the county of Onondaga and State of New York, have invented a new and useful Holdback, of which the following is a specification.

My invention has reference to shaft hold back devices to which the harness breeching strap is connected and my said invention primarily has for its object to provide a device of the general character stated of a simple compact and economical construction, adapted for being readily applied to the shaft, one that is practical and which can be conveniently operated.

Another object of my invention is to provide an improved arrangement of the several parts that constitute my invention, so there is no danger of the said parts becoming accidentally disconnected while in use, which are adapted for being instantly adjusted to the shaft releasing condition and as readily returned to the operative position for connecting the shafts with the breeching straps.

With other objects in view, that will be hereinafter referred to, my invention is an improved hold back device that embodies the peculiar features of construction and novel arrangement of parts, that will be fully explained in the following detailed description thereof, specifically stated in the appended claims and illustrated in the accompanying drawings, in which:

Figure 1 is a side elevation of my improved construction of hold back, the same being shown as operatively applied to a portion of a shaft and the holdback strap.

Fig. 2 is a cross section of the device taken practically on the line 2—2 on Fig. 1.

Fig. 3 is a detail cross section on the line 3—3 on Fig. 1.

Fig. 4 is a perspective view of the base plate or member hereinafter referred to.

Fig. 5 is a like view of the shiftable breeching strap connection.

Fig. 6 is a perspective view of the detent or locking member.

Fig. 7 is a detail longitudinal section that illustrates the interlockable connection of the locking member and the base plate.

In the practical arrangement, my hold back device comprises, essentially but three main parts, one of which is hereinafter termed the base member, with which co-operates a shiftable strap connection and a detent or lock for holding the said shiftable member in a fixed engagement with the base member, when the several parts are operatively adjusted, as will hereinafter be fully explained.

The base member comprises a plate $h$ of a somewhat elongated shape and transversely curved to conform to the cross sectional shape of the shaft, to which shaft it is applied at a suitable point, preferably toward that end thereof from which the common form of hold back is usually attached.

Plate $h$ is fixedly atttached to the shaft, preferably on the top thereof as shown in Fig. 1, by screws that engage apertures $k$—$k$, one at each end and which are countersunk at the top for the close fitting of the screw.

At the rear end, adjacent the hole $k$, the plate $h$ has a lug $j$ that constitutes a lock stop for coengaging the lock or detent member presently described.

The outer face of the lug $j$ is undercut as at $j'$ to form a hook for securing the outer end of a strap connection, which latter consists of a body plate $b$ that is provided at the outer end with an elongated slot $d$ and at its inner end with a vertically projected bracket portion $b'$ that terminates in a slotted member $a$ through which the hold back strap $s$ is, in practice, passed, when applying my hold back devices to the operative position.

As is clearly shown in Figs. 5 and 7, the elongated slot $d$, in the member $b$, admits of readily slipping the said member over the stud $j$ to interlock with the hook portion thereof, as best shown in Fig. 7.

The detent or lock member before mentioned, consists of a plate F, the rear end of which is bifurcated to fit over the vertical shank $b'$ of the strap connection, and the opposite members $f$—$f$ that embrace the shank $b'$ are apertured as at $f'$—$f'$ to aline with an aperture $c$ in the shank $b'$, the said aperture being provided for receiving a stud pin $c'$ that constitutes a hinge on which the detent or lock member swings, in the vertical plane, as indicated by the arrow $x$ on Fig. 7.

The front end of the plate F is notched, as at $f^2$, to slip over the back wall of the stud $j$, the latter acting as a brace to hold the plate F from undue lateral strain with respect to the base plate $h$, and to further hold the several parts from rattling or working loose, the base plate $h$ has side guides $i$—$i$ under which the opposite edges of the slotted strap connection of plate $b$, project and are guided.

At the rear edge, the base plate $b$ has a closure between the guides $i$—$i$ that has a central passage $m$ through which the bottom of the shank $b'$ has endwise movement, when shifting the strap connection for securing or releasing the breeching strap to or from the shaft.

The detent F also includes an upwardly and outwardly curved finger piece $e$ and the said piece $e$ is projected over the rear end of the device in such manner that the said detent F may be readily swung up over the top of the lug $j$, when it is desired to release the breeching from the shaft which may be readily accomplished after the detent F is swung up to the released position, by pulling the connection $b$, with the slotted keeper $a$, outward sufficiently for the front end of the slot $d$ to clear the hook face of the stud $j$, it being understood that to connect the breeching to the shaft, it is only necessary to slip the slotted member $b$ over the hook stud $j$ and, after engaging with the said stud, by swinging the detent F down to the operative position to engage the front face of the lug $j$, the breeching strap will be held to its connection with the shaft.

To keep the detent F from accidentally flying up, when the device is in use, while driving, the said detent is held down to its locked position by a pair of coil springs $n$—$n$, both of which connect to a central eye $o$ as on the finger piece $e$ and extend laterally to the opposite sides and connect with the eyes $p$—$p$ on the slidable member $b$, as shown.

From the foregoing description taken in connection with the drawings, the complete construction, the manner of operating and the advantages of my construction of hold back device will be readily apparent to those accustomed to the use of devices of this kind.

My device is such that it can be readily operated to connect with or disconnect the breeching with the shaft, there is no danger of the device becoming disconnected while driving along the road, the means for releasing or applying the device being so simple that the said device may be easily operated and set almost instantly in winter when the temperature is so low that it would require several minutes to unwind and disconnect or apply the breeching strap to or releasing it from the shaft.

What I claim is:

1. A hold back device comprising a base plate attachable to a shaft, and a longitudinally slotted plate that includes a member for connecting with the breeching strap, the said body plate and the base plate having engaging means including a locking lug on the base plate that extends through the longitudinal slot in the body plate and a detent carried by the slotted body plate adapted for engaging the lug, whereby to hold the body and base plates in interlocked engagement.

2. A hold back device, comprising in combination, a base plate having provision for securing it upon a shaft, said plate having a locking lug at one end and guideways at the opposite edges of the other end, a body plate having a slotted upright for receiving the end of the hold back strap, said body plate having an elongated slot for slidably fitting over the locking lug, and a detent for holding the said slotted plate in interlocked engagement with the lug, the opposite edges of the forward or solid end of the body plate engaging the guideways of the base plate.

3. A hold back device, comprising in combination, a base plate having provision for securing it upon a shaft, said plate having a locking lug at one end and guideways at the opposite edges of the other end, a body plate having a slotted upright for receiving the end of the hold back strap, said body plate having an elongated slot for slidably fitting over the locking lug and a detent for holding the said slotted plate in interlocked engagement with the lug, the opposite edges of the forward or solid end of the body plate engaging the guideways of the base plate, said detent comprising a member hinged to the front end of the body plate to swing in the vertical plane with its outer end adapted for being swung down to engage the back of the locking lug on the base plate and including a lifting member at the said front end.

4. A hold back device, comprising in combination, a base plate having provision for securing it upon a shaft, said plate having a locking lug at one end and guideways at the opposite edges of the other end, a body plate having a slotted upright for receiving the end of the hold back strap, said body plate having an elongated slot for slidably fitting over the locking lug and a detent for holding the said slotted plate in interlocked engagement with the lug, the opposite edges of the forward or solid end of the body plate engaging the guideways of the base plate, said detent comprising a member hinged to the front end of the body plate to swing in the vertical plane with its outer end adapted for being swung down to engage the back of the locking lug on the base plate and including a lifting member at the said front end, and means for holding the said detent down to its engagement with the locking lug.

5. A hold back device comprising in combination, a base plate having provision for securing it upon a shaft, said plate having a locking lug at one end and guideways at the opposite edges of the other end, a body plate having a slotted upright for receiving the end of the hold back strap, said body plate having an elongated slot for slidably fitting over the locking lug and a detent for holding the said slotted plate in interlocked engagement with the lug, the opposite edges of the forward or solid end of the body plate engaging the guideways of the base plate, said detent comprising a member hinged to the front end of the body plate to swing in the vertical plane with its outer end adapted for being swung down to engage the back of the locking lug on the base plate and including a lifting member at the said front end, and means for holding the said detent down to its engagement with the locking lug, the said means consisting of springs attached to the detent and to the opposite side edges of the base member.

ROBERT TALLON.